United States Patent
le Masno do Chormont

(10) Patent No.: US 7,150,026 B2
(45) Date of Patent: Dec. 12, 2006

(54) CONVERSION OF DATA FOR TWO OR THREE DIMENSIONAL GEOMETRIC ENTITIES

(75) Inventor: Francois le Masno do Chormont, San Francisco, CA (US)

(73) Assignee: OKYZ, Paris (FR)

( * ) Notice: Subject to any disclaimer, the term of this patent is extended or adjusted under 35 U.S.C. 154(b) by 0 days.

(21) Appl. No.: 10/482,742

(22) PCT Filed: Jul. 4, 2001

(86) PCT No.: PCT/FR01/02136

§ 371 (c)(1),
(2), (4) Date: May 13, 2004

(87) PCT Pub. No.: WO03/005201

PCT Pub. Date: Jan. 16, 2003

(65) Prior Publication Data

US 2004/0189671 A1 Sep. 30, 2004

(51) Int. Cl.
*G06T 15/00* (2006.01)
*G09G 5/00* (2006.01)
*G06F 3/00* (2006.01)
*G06F 9/44* (2006.01)
*G06F 13/00* (2006.01)
*G06F 19/00* (2006.01)

(52) U.S. Cl. ............... 719/328; 345/419; 345/619; 719/328; 700/97; 700/98

(58) Field of Classification Search ........ 345/619–631; 719/328
See application file for complete search history.

(56) References Cited

U.S. PATENT DOCUMENTS

| 5,819,062 A | * | 10/1998 | Srikantappa | ............... 716/11 |
| 6,573,890 B1 | * | 6/2003 | Lengyel | .................. 345/419 |
| 6,734,849 B1 | * | 5/2004 | Dimsdale et al. | ......... 345/419 |
| 6,738,065 B1 | * | 5/2004 | Even-Zohar | .............. 345/473 |

(Continued)

FOREIGN PATENT DOCUMENTS

| EP | 0 822 499 | 2/1998 |
| EP | 0 822 499 A1 * | 2/1998 |
| WO | WO 98/53429 | 11/1998 |

OTHER PUBLICATIONS

BaderEddin, Ali. "Geometric Primitives". From the code project, http://www.codeproject.com/opengl/Geometric_Primitives.asp.*

(Continued)

*Primary Examiner*—Ulka Chauhan
*Assistant Examiner*—Eric Woods
(74) *Attorney, Agent, or Firm*—Fish & Richardson P.C.

(57) ABSTRACT

A method for transmission of data for two- or three-dimensional geometrical entities uses a computer system (1), for modelling and/or manipulation of geometrical entities (10). The computer system (1) comprises at least one program for modelling and/or manipulation (11) and at least one display program (12), the at least one modelling and/or manipulation program (11) transmits the data associated with the geometrical entities (10) for display to the at least one display program (12), by calling up display functions located within the at least one display program (12). An exporting program (15) for data associated with geometrical entities (10) is substituted in at least one of the at least one display programs (12), the exporting program (15) having the same display functions as the at least one display program (12).

18 Claims, 4 Drawing Sheets

U.S. PATENT DOCUMENTS

| | | | |
|---|---|---|---|
| 2002/0050992 A1* | 5/2002 | Deering | 345/423 |
| 2003/0135846 A1* | 7/2003 | Jayaram et al. | 717/137 |
| 2003/0163602 A1* | 8/2003 | Johnson et al. | 709/328 |
| 2004/0145614 A1* | 7/2004 | Takagaki et al. | 345/964 |
| 2004/0153824 A1* | 8/2004 | Devarajan et al. | 714/38 |
| 2005/0193003 A1* | 9/2005 | Popovici | 707/104.1 |

OTHER PUBLICATIONS

Blythe, David. OpenGL tutorial, section 6.15. 'Visualizing Surface Orientations'.*

"Hawk Software—GLTrace2 Programming Utility", Hawk Software, 2000, 2 pages, http://web.archive.org/web/20000818032845/http://www.hawksoft.com/gltrace, retrieved Jun. 30, 2005.

"Hawk Software—Download: Developer Files, Misc. Files", Hawk Software, 2000, 4 pages, http://www.web.archive.org/web/20000818032858/www.hawksoft.com/download, retrieved Jun. 30, 2005.

"E&S GL Trace", gewang.com, 2001, 2 pages, http://web.archive.org/web/20010512143911/http://www.gewang.com/projects/gltrace, retrieved Jun. 30, 2005.

"E&S Desktop Graphics OpenGL Trace Tool (Introduction)", gewang.com, 2001, 3 pages, http://web.archive.org/web/20010519172604/www.gewang.com/projects/gltrace/dt_intro.html, retrieved Jun. 30, 2005.

"E&S Desktop Graphics OpenGL Trace Tool (Usage)", gewang.com, 2001,2 pages, http://web.archive.org/web/20010519092341/www.gewang.com/projects/gltrace/dt_usage.html, retrieved Jun. 30, 2005.

"E&S Desktop Graphics OpenGL Trace Tool (DtFuncDef)", gewang.com, 2001, 7 pages, http://web.archive.org/web/20010519172057/www.gewang.com/projects/gltrace/dt_funcdef.html, retrieved Jun. 30, 2005.

Reddy, "Intel Graphics Performance Toolkit Cuts 3D R&D Time", Intel DeveloperUPDATEMagazine, Feb., 2000, 6 pages.

"Intel Demonstrates Abilities of Next Generation Processors at Game Developers Conference", Intel Corporation, Mar. 10, 2000, 1 page, http://appzone.intel.com/pressroom/PrintPress Release.asp?file=http://www.intel.com/pressroom/archive/releases/dp03100.htm, retrieved Jun. 29, 2005.

Humphreys, et al. "A Distributed Graphics System for Large Tiled Displays", IEEE Visualization, 1999, 9 pages.

Humphreys, et al. "A Distributed Graphics System for Large Tiled Displays", ACM Portal, 1999, 4 pages, http://portal.acm.org/citation.cfm?id=319377, retrieved Jun. 30 2005.

Buck, et al. "Tracking Graphics State for Networked Rendering", Siggraph/Eurographics Workshop on Graphics Hardware, Proceedings of the ACM Siggraph/Eurographics Workshop on Graphics Hardware, 2000, 9 pages.

Buck, et al. "Tracking Graphics State for Networked Rendering", ACM Portal, 2000, 4 pages, http://portal.acm.org/citationcfm?id=348233, retrieved Jun. 29, 2005.

Humphreys, et al. "Distributed Rendering for Scalable Displays", Proceedings of the 2000 ACM/IEEE Conference on Supercomputing, 2000, 8 pages.

Humphreys, et al. "Distributed Rendering for Scalable Displays", ACM Portal, 2000, 4 pages, http://portal.acm.org/citation.cfm?id=370049.370400, retrieved Jun. 30, 2005.

Mohr A et al: "Non-Invasive, interactive, stylized rendering"Proceedings of the Symposium on Interactive 3D Graphics 2001, Mar. 19-21, 2001, pp. 175-178, XP002196093 Research Triangle Park, Inc, NC, United States abstract p. 175, right hand column, line 3-line 6 p. 176, left-hand column, line 31-right-hand column, line 11 p. 177, right-hand column, line 13-line 41.

Kempf R, Hartman J: "OpenGL on Silicon Graphics Systems" SGI Technical Publications, Online No. 007-2392-002, Jun. 15, 1998 (1998-06-15), pp. i, ii, 26-303, XP002196094 Retrieved from the Internet: <URL:http://techpubs.sgi.com/library/manuals/2000/007-2392-002/pdf/007-2392-002.pdf>[1]retrieved on Apr. 15l, 2002 p.269-p. 277, p. 280-p. 285.

Walders H: "glAnalyze the Newest OpenGL Product" 3DSite Newsletter, "Online!No. 10, Apr. 29, 1999, XP002196095 Retrieved from the Internet: <URL:http//www.3dsite.com/n/sites/3dsite/newsletter/issues/10sec12.html>"retrieved on Apr. 15, 2002! the whole document.

* cited by examiner

CONVERSION OF DATA FOR TWO OR THREE DIMENSIONAL GEOMETRIC ENTITIES

This invention generally concerns the exportation of computer data, and more specifically the exportation of data associated with geographic entities from a computer program such as a computer-assisted design (CAD) program or a videogame.

The technique and systems for modeling and/or manipulation of geometric entities such as CAD and videogames are now quite widespread in all fields of the industry, from computer-assisted design of products such as automobiles or aircraft to 3D virtual reality action games, and including simulation programs such as flight simulators.

In particular, although the CAD technique is relatively young, under twenty years old, the need for upward compatibility by the prior CAD systems led to the retention of existing data structures that only partially used the possibilities of the modern computer systems, despite the rapid evolution of information technologies.

Additionally, whether in the field of CAD or videogames, the format of these data structures used is universally proprietary, meaning it is specific to the software involved or, as a minimum, to the software publisher involved. However, at least in the CAD field, these graphic programs generally have the functionalities to import various data formats associated with geometric entities.

On the other hand, clearly for customer retention purposes, the publishers of these programs, whoever they may be, are not inclined to publish the specifications for the data formats they use, and, in the same vein, they are generally rather reticent to offer utilities making it possible to export all of the data from their programs to a competitor's program.

This situation means that it is very difficult to transfer all of the data used by these programs from a computer system for modeling and/or manipulation of geometric entities to a similar computer system. However, this transfer is frequently made necessary, for example, to transfer data among different CAD systems as they exist at the various subcontractors of a single customer, even within one company, as happens in particular for reasons that generally relate to backward compatibility in the major companies having used CAD for a long time.

It can be expected that the evolution of videogame technology will ultimately make it possible to import characters or objects into a videogame, which will then raise the problem again of exporting this type of entity from another videogame.

This need to transfer data between different systems for modeling and/or manipulation of data associated with geometric entities means that there are quite significant development costs on the conversion utilities for these data, due to the absence of precise specifications concerning the format of the databases involved, and it also means that these utilities should be rewritten partially or in full at the time of upgrades or modifications made to the structure of the databases of the systems involved. Also, this conversion is generally incomplete, due to the absence of precise specifications for the format of the data to be converted.

Furthermore, there is a need in companies using CAD systems for an open data structure and format, widespread and well-defined, as a means of exchange among different CAD systems as well as to ensure minimal independence regarding the publishers of the CAD programs they use, to allow CAD data capture from one program to another in the event the publisher of the CAD program used goes out of business.

In view of the foregoing, it is clear there is a need for a process and a system to make it possible, in an affordable and reliable manner, to export data associated with geometric entities from any program for modeling and/or manipulation of data associated with geometric entities, with no knowledge of the data structures used by this program, without any modification of this program in any way and without development of a specific interface to the program involved.

There are known utilities such as glTrace or glAnalysePro that make it possible to intercept and store the graphic primitives or function calls made by a graphic application. However, the function of these utilities is only to debug the graphic application involved, and not to allow the exportation of data associated with geometric entities to other systems of the same kind.

The object of this invention is therefore to propose a process for exporting data associated with geometric entities using a computer system for modeling and/or manipulation of geometric entities, said computer system for modeling and/or manipulation of geometric entities including at least one central processing unit that can execute computer programs, a memory that can store said computer programs and data associated with geometric entities throughout the course of execution of said computer programs, and at least one storage unit allowing permanent storage of the data associated with geometric entities, said computer system including at least one program and modeling and/or manipulation of geometric entities and at least one program to display data associated with geometric entities, said at least one program for modeling and/or manipulation transmitting the data associated with geometric entities to be displayed, said at least one display program calling the display functions located in said at least one display program, said data to be displayed by said display program being transmitted by said at least one program for modeling and/or manipulation of said at least one display program in the form of call parameters, said display functions called by said at least one program for modeling and/or manipulation of said display functions called by said at least one program for modeling and/or manipulation of geometric entities, said display functions making it possible to display a certain number of data associated with geometric entities, and characterized in that a program for exportation of data associated with geometric entities is replaced by at least one of same at least one display programs, said exportation program having the same function of displaying data associated with geometric entities as that of at least one display programs, said functions of displaying data associated with geometric entities of said exportation program having the same parameters as the corresponding functions of said at least one display program, said at least one program for modeling and/or manipulation of geometric entities transparently calling the functions of said exportation program instead of the corresponding functions of said at least one display program.

In the process of the invention, at least one of said at least one programs for modeling and/or manipulation can be, for example, a computer-assisted design, or CAD, program, or even a videogame program.

Additionally, during a call of said, at least one program for modeling and/or manipulation to one of said display functions of said exportation program, said exportation program can store in an appropriate format, within said at least one storage unit, data from processing by said exportation program of the calls to said at least one program for modeling and/or manipulation to said display functions of said exportation program.

Further, during a call of said at least one program for modeling and/or manipulation to one of said display functions of said exportation program, said exportation program may call the display function of said display program corresponding to said display function called in said exportation program with the same call parameters as those present in the call to said function of said exportation program.

In this case, said called display program can be said display program for which said exportation program was replaced, or a different display program from that for which said exportation program was replaced.

Said computer system can also include at least one graphic display device, said at least one display device including at least one refresh and/or display memory, said at least one display memory ordering said at least one display device to digitize in the form of points said calls for display functions received by said display program, said display device storing in said refresh and/or display memory said points coming from said digitization of said calls for display functions received by said at least one display program.

In this case, said computer system can also include at least one graphic screen in which said refresh and/or display memory is reread by said at least one display device, said at least one display device displaying on said at least one graphic screen said points reread from said refresh and/or display memory.

Said exportation of data by said exportation program can then be triggered by at least one specific graphic instruction transmitted by said at least one program for modeling and/or manipulation of said exportation program, said at least one specific graphic instruction triggering said data exportation being, for example, an instruction causing completion of said digitization of said graphic function calls received in said points in said refresh and/or display memory.

As a variation, said at least one display device includes at least two refresh and/or display memories, in which said instruction causing said exportation can then be an instruction causing the switch from one of the said at least two refresh and/or display memories to another of said at least two refresh and/or display memories.

Furthermore, during a call of said program for modeling and/or manipulation to one of said display functions of said exportation program, said exportation program can store in said memory, in an appropriate format, data from processing by said exportation program of calls to said display functions of said exportation program. In this case, said computer system can also execute a utility program reading in said memory said data from processing by said exportation program. Furthermore, said utility program rereading said memory can then store in an appropriate format in said at least one storage unit said data from processing by said exportation program reread from said memory.

Additionally, said utility program can also display said data reread from said memory with the held of appropriate calls to the display function of said at least one display program.

The one of said at least one display program for which said exportation program is substituted may be, for example, compliant with the Silicon Graphics, Inc. OpenGL specification. In this case, said at least one instruction causing said exportation could be the OpenGL instruction "wglSwapBuffers" and/or the OpenGL instruction "glFlush."

Also, the one of said at least one display program for which said exportation program is replaced may also be compliant with the Microsoft DirectX specification.

Generally, in the process of the invention, said data associated with geometric entities would include geometric data. In this case, said geometric data could be bidimensional and/or tridimensional. Said geometric data could then include data on points and/or data on two-point segments and/or data on triangles and/or data on quadrangles and/or data on polygons.

Likewise, said geometric data could be associated with line and/or surface and/or volume geometric entities. Said geometric data associated with geometric entities could then also include geometric data associated with at least one normal vector with at least one of said line and/or surface and/or volume entities.

Said data associated with geometric entities could include data on color and/or data on texture.

The invention also proposes a system for exporting data associated with geometric entities using a computer system for modeling and/or manipulation of geometric entities, said computer system for modeling and/or manipulation of geometric entities including at least one central processing unit that can execute computer programs, a memory that can store said computer programs and data associated with geometric entities throughout the course of execution of said computer programs, and at least one storage unit that can permanently store data associated with geometric entities, said computer system including at least one program for modeling and/or manipulation of geometric entities and at least one display program for data associated with geometric entities, said at least one modeling and/or manipulation program transmitting the data associated with geometric entities to be displayed to said at least one display program by calling the display functions located in said at least one display program, said data to be displayed by said display program being transmitted by said at least one program for modeling and/or manipulation to said at least one display program in the form of call parameters of said display functions called by said at least one program for modeling and/or manipulation of geometric entities, said display functions allowing display of a certain number of data associated with geometric entities, and characterized in that it implements the process according to any of the preceding claims.

Now, solely as an example, two embodiments of the invention are described, referring to the attached drawings, in which.

Figure 1:
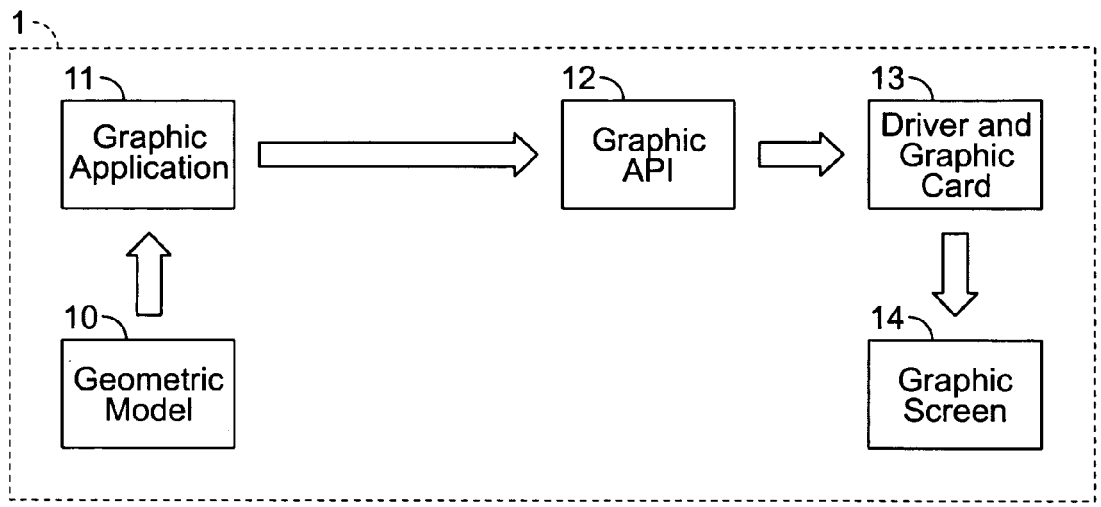
FIG. 1 is the block diagram of the display of a geometric model on the screen of a computer with the help of a library of standard display functions, without using the exportation process of the invention.

The process of the invention functions in a computer system 1 for modeling and/or manipulation of data associated with geometric entities.

This computer system 1 allows implementation by a user 2, not shown, of a program 11 for modeling and/or manipulation of data associated with geometric entities, regardless of whether the process of the invention is implemented on the computer system 1. The computer system 1 also allows display on a graphic screen 14 of graphic signals from a graphic interface card 13 driven by a library of graphic functions 12.

In the continuation of this description, the program 11 for modeling and/or manipulation of data associated with geometric entities could also be referenced as the graphic application for greater simplicity.

In the referred embodiments of the invention, the computer system 1 used to make the process of the invention function is a computer running the Microsoft Windows operating system, and in this operating system, the program for displaying geometric data is a graphic API (Advanced Programming Interface) implemented via a dynamic link, or DLL, library, compliant, for example, with the Silicon Graphics, Inc. OpenGL specification. This DLL is generally located in the Windows system directory, and it is called "opengl32.dll."

As the OpenGL library includes hundreds of functions, all of the OpenGL functions used as examples in this description, whether with or without implementation of the process of the invention, were voluntarily limited to a very reduced subset of OpenGL functions to allow this description to be of a reasonable size. However, it should be understood as of now that the principle of the invention is not limited to the OpenGL functions stated in this description, but it likewise applies to all functions existing in the OpenGL specification.

Referring to FIG. 1, we will now describe the operating principle for the display of a geometric model 10 on the graphic screen 14 without using the process of the invention for exporting data.

When the graphic application 11 wishes to display a geometric model 10 on the graphic screen 14, it calls the graphic functions located in the DLL of the graphic interface 12. This graphic interface 12 sends vector commands to the graphic interface card 13 via its associated software driver.

As the computer screens themselves are made of cathode ray tubes or similar devices, making the display by video scanning, this means it is necessary to store a binary image of the graphic data displayed, so that a visual persistence of the graphic data displayed can be maintained for the user 2. This binary image, formed of a certain number of bits for each of the displayable points on the graphic screen 14, is stored in an internal memory on the graphic interface card 13, called refresh memory. The visual persistence of the data for the user 2 is obtained by the graphic interface card 13 by rereading this binary image dozens of times a second, and generating video signals from the information reread representing the stored image in the refresh memory of the graphic interface card 13. These video signals are sent by the graphic interface card 13 to the graphic screen 14 on which they cause the display of the image stored in binary form in the refresh memory of the graphic interface card 13.

A graphic application 11 wishing to display a geometric model 10 on the screen of the computer will thus execute a sequence of calls to the graphic functions present in the OpenGL DLL. In the OpenGL specification, this sequence of graphic function calls is terminated by a call to a specific function that will cause completion of the conversion of instructions sent to the graphic interface card 13 on binary points displayed on the graphic screen 14.

For example, to display a geometric model 10 formed of a strip of two triangles T1 and T2 go respectively through points ABC and BCD of the respective coordinates:

A: (0, 10, 0);
B: (0, 10, −10);
C: (0, 0, 0);
D: (0, 0, −10);

the graphic application 11 will make the following graphic function calls to the OpenGL DLL 12:

glBegin(GL_TRIANGLE_STRIP)
glVertex3fv (0.000, 10.000, 0.000)
glVertex3fv (0.000, 10.000, −10.000)
glVertex3fv (0.000, 0.000, 0.000)
glVertex3fv (0.000, 0.000, −10.000)
glEnd( )
wglSwapBuffers( )

In this sequence of calls, the call glBegin(GL_TRIANGLE_STRIP) indicates the beginning of the strip of triangles and the call glEnd( ) indicates its end. The function glVertex3fv allows definition of one of the vertices of the triangles by its three x, y and z coordinates.

When all the preceding components were sent by the graphic application 11 to the graphic interface 12 via the above function calls, the graphic application 11 causes completion of display of the components previously sent using an appropriate function of the graphic interface 12, such as the function the "glFlush" or the function "wglSwapBuffers" appearing in the above example. These functions both cause completion of the conversion of the graphic instructions previously received in bit images in the current refresh memory of the graphic interface card 13, terminating the display of the graphic instructions received previously on the graphic screen 14.

The instruction "wglSwapBuffers" also causes the swapping of the two frame memories of the graphic interface card 13 in the event this graphic interface card 13 has two.

In the case of the example of display described, the reception the instruction "wglSwapBuffers" causes the display on the graphic screen 14 of graphic instructions transmitted by the graphic application 11 to the graphic interface card 13 via the graphic interface 12. In this case, this completes the display of the geometric model 10 formed of the two triangles T1 and T2 on this graphic screen 14.

Figure 2:
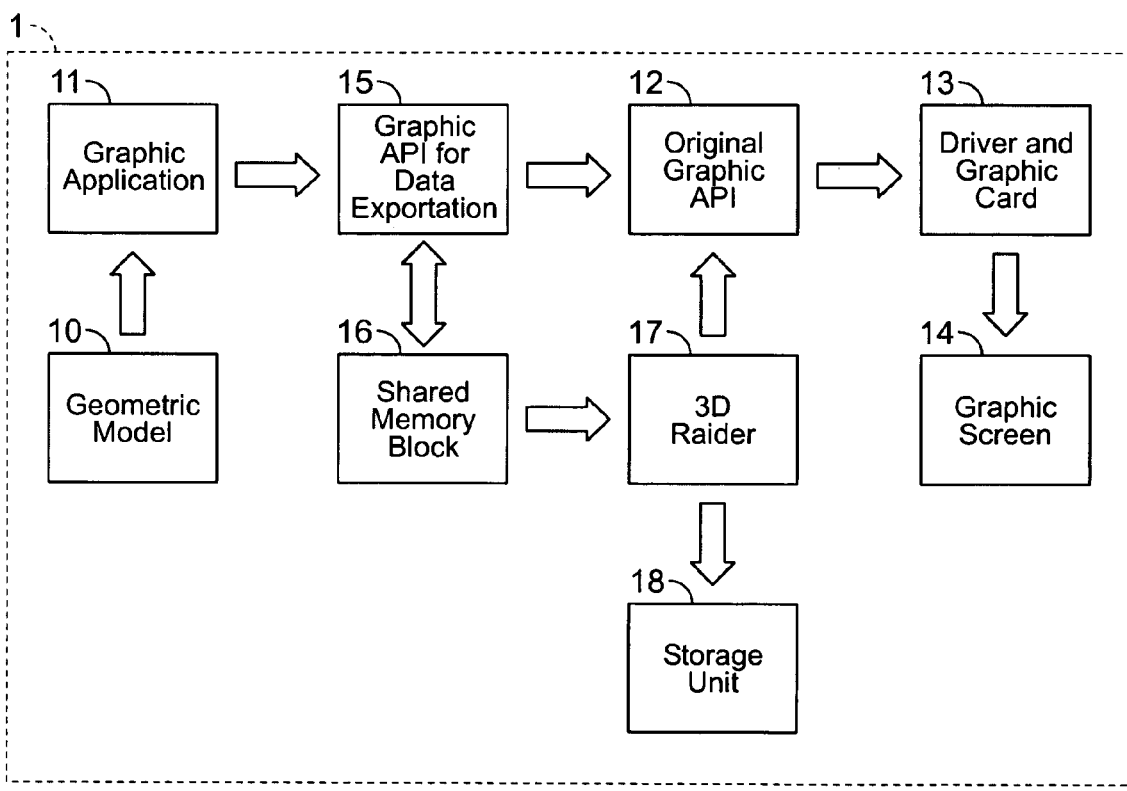
FIG. 2 is the block diagram of the display of a geometric model on the screen of a computer, using the process of exporting data associated with geometric entities according to the invention.
Figure 3:
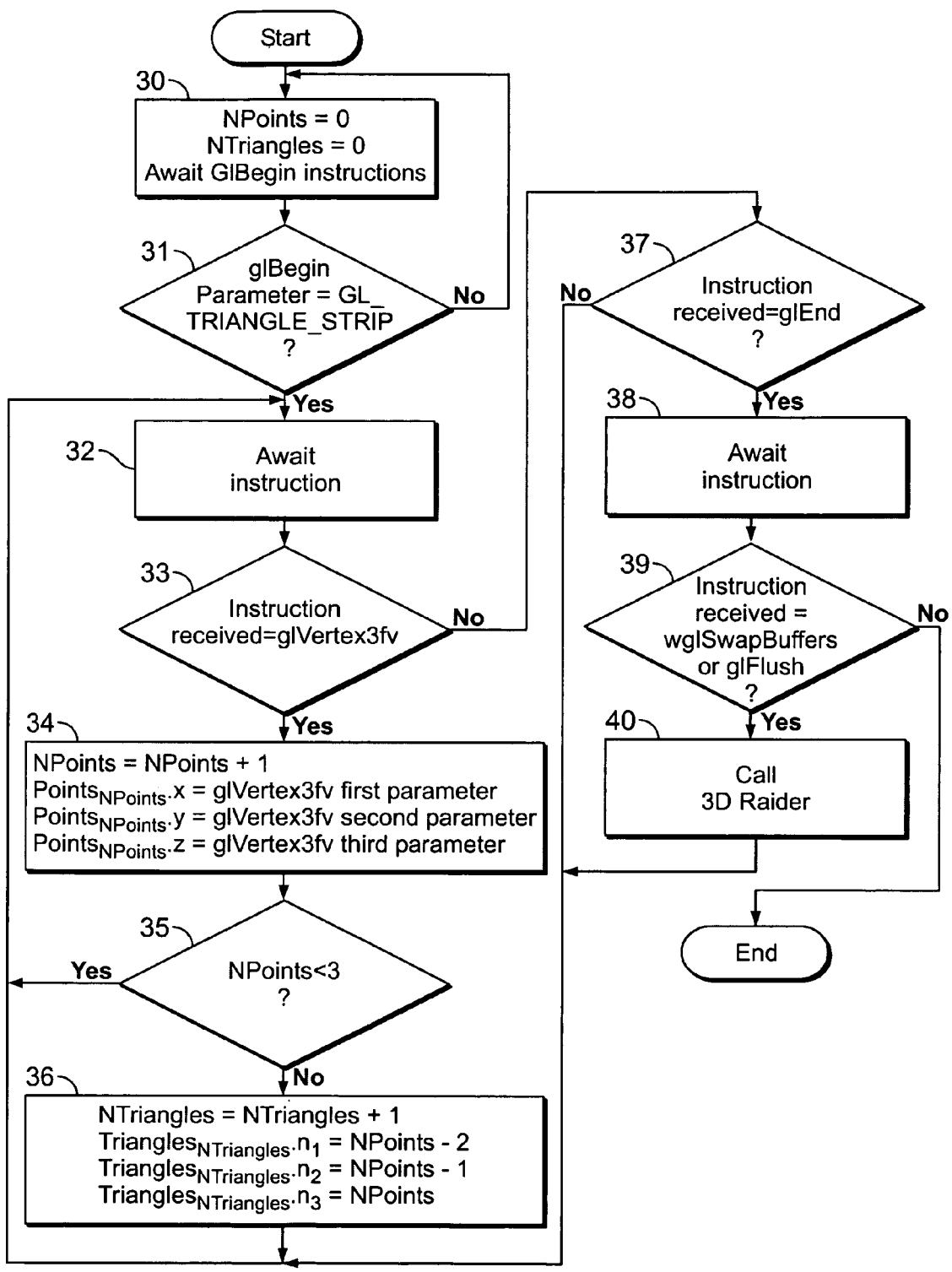
FIG. 3 is a flowchart of the process of exporting data from a geometric model according to the invention.

Referring now to FIGS. 2 and 3, we will now describe the exportation of a geometric model implementing the process of exportation of the invention.

During installation of the program for exportation of graphic data implementing the process of the invention, the original DLL "opengl32.dll" present in the Windows system directory is named, for example, as "opengl32bis.dll" and it is replaced by a DLL 15 implementing the process of the invention, and named identically to the original, meaning "opengl32.dll." This DLL 15 according to the invention has the same functions in compliance with the OpenGL specification as the original DLL, meaning it has the same interface functions with the same names and same parameters as the original OpenGL DLL.

When an operator 2, not shown, wishes to export the data from a geometric model 10 created and/or manipulated by the graphic application 11, it first executes the DLL according to the invention as described above. He then has the desired geometric model 10 displayed by the graphic application 11. In the same way as described previously in using the computer system 1 without implementing the process of the invention, when the graphic application wishes to display a geometric model on the screen, it uses the DLL 15 named "opengl32.dll" found in the Windows system directory, meaning it makes calls to the functions and to the primitives in accordance with the OpenGL specification contained in this DLL 15.

Considering that, at the time of installation of the exportation program for data associated with the geometric entities according to the invention, the DLL was replaced by the DLL 15 implementing the process of the invention, the graphic application then transparently calls the functions and primitives present in the DLL 15 implementing the process of the invention, instead and in place of the functions and primitives present in the original DLL.

As a variation, the DLL 15 called "opengl32.dll" could be installed only by a specific graphic application 11 for geometric entities modeling or manipulation, by installing the DLL 15 only in the directory of the specific graphic application 11. In fact, when the Windows operating system searches for a DLL 15 referenced by a graphic application 11, it first searches for this DLL 15 in the same directory as the one where the graphic application 11 is found. As a default, the Windows operating system then searches for this DLL 15 in the predefined directories of the system 1, which include, among others, the system directory where the Windows operating system is installed.

Thus, when the process of the invention is implemented, and using the above example, the DLL 15 of the process of the invention receives, instead and in place of the original OpenGL DLL, the graphic function calls intended for the latter. In the current embodiments of the invention, the DLL 15 of the invention then transmits to the original DLL the function calls received, meaning it calls the corresponding functions of the DLL with the same parameters as those received in the calls from the graphic application 11.

Consequently, the DLL 15 of the invention receives the following function calls:
glBegin(GL_TRIANGLE_STRIP)
glVertex3fv(0.000, 10.000, 0.000)
glVertex3fv(0.000, 10.000, −10.000)
glVertex3fv(0.000, 0.000, 0.000)
glVertex3fv(0.000, 0.000, −10.000)
glEnd( )
wglSwapBuffers( )

To export data associated with geometric entities, the program contained in the DLL 15 according to the invention stores and manages in its memory 16 a certain number of tables of data associated with geometric entities, such as, but not limited to, a "Points" table of points and a "Triangles" table of triangles. Initially, these two tables are empty, meaning the number of NPoints components in the Points table and the number of NTriangles components in the Triangles table are all zero.

The DLL 15 program starts at step 30 where it initializes the number of points NPoints and the number of triangles NTriangles at value 0, then it awaits reception of a graphic instruction from the graphic application 11. At the time of reception of the instruction glBegin(GL_TRIANGLE_STRIP), the process according to the invention moves to step 31 where it tests whether the value of the parameter of the instruction GL_BEGIN is the predefined value GL_TRIANGLE_STRIP indicating the beginning of a sequence of graphic instructions defining a strip of triangles by their vertices. If the response is negative, the process returns to step 30. If the response to step 31 is positive, meaning if the value of the parameter is GL_TRIANGLE_STRIP, the process moves to step 32 where it awaits a graphic instruction.

At the time of reception of a graphic instruction, the process of the invention tests in step 33 whether the instruction received is a glVertex3fv instruction; in the case of the example given, the response is positive, and at the time of reception of the call glVertex3fv (0.000, 10.000, 0.000), the process of the invention then moves to step 34. In step 34, the DLL 15 then increases by one unit the number of points received NPoints, meaning it moves the NPoints number of points from its initial value zero to value 1. It then stores the point received in the Points table, meaning that, still in step 34, it also stores respectively the first, second and third parameter of the instruction glVertex3fv received, in this case the values 0.000, 10.000 and 0.000, in the spaces for the x, y and z coordinates of the first point in the Points table. The process of the invention then moves to step 35.

In step 35, the process of the invention tests whether the number NPoints of points received is lower than 3. If the response is positive, the process of the invention returns to step 32, or else the process of the invention moves to step 36.

When, in step 33, the response is negative, this means that at least three points were transmitted by the previous glVertex3fv instructions. According to the OpenGL specification for the triangle strip GL_TRIANGLE_STRIP, this means that a triangle in the strip, formed by the three last points received, was defined.

Consequently, in step 36, the DLL 15 program implementing the process of the invention thus increases the number of triangles received from a unit, meaning it increases the number NTriangles of triangles received from a unit. It then stores the numbers $n_1$, $n_2$ and $n_3$ of the points forming the triangle thus received, meaning, according to the OpenGL specification, the last three points received, in the corresponding spaces of the triangles table, meaning it stores the numbers NPoints-2, NPoints-1 and NPoints of the last three points received in spaces $n_1$, $n_2$ and $n_3$ of the space for number NTriangles in the Triangles table.

The DLL 15 then returns to step 32 to await other possible points from the strip of triangles transmitted by the graphic application 11.

The process of the invention repeats steps 32 to 36 until the response is negative in step 33.

In the example described, after having four points via the four "glVertex3fv" instructions, the DLL 15 receives no other "glVertex3fv" instructions, but it receives instead a "glEnd" instruction. Consequently, in step 33, the response is negative, and the DLL 15 then moves to step 37.

In the OpenGL specification, the instruction "glEnd" means that the sequence of graphic instructions begun by the previous instruction glBegin, in this case the strip of triangles GL_TRIANGLE_STRIP, is terminated.

In step 37, the DLL 15 tests whether the last function call received was a call to the function "glEnd." If the response is negative, the program contained in the DLL 15 returns to step 32. When the response of the test in step 37 is positive, the program of the DLL 15 moves to step 38. In the example described, this happens when the graphic application 11 sends the instruction "glEnd" after the four "glVertex3fv" instructions.

In step 38, the program contained in the DLL 15 of the invention is waiting for an instruction from the graphic application 11, then, when such an instruction is received, it moves to step 39.

In step 39, the DLL 15 program tests whether the graphic instruction received is an OpenGL "wglSwapBuffers" or "glFlush" instruction. If the response is negative, meaning if the instruction received is neither a "wglSwapBuffers" instruction nor a "glBuffers" instruction, the DLL 15 program according to the process of the invention is terminated. If the response to step 39 is positive, the DLL 15 program moves to step 40.

In the example described, after the "glEnd" instruction is sent, the graphic application 11 sends the instruction "wglSwapBuffers" to the program 15, but the "glFlush" instruction could also have been used.

As indicated previously in implementation of the computer system 1 without using the process of the invention, these instructions cause the completion of the conversion of the graphic instructions and their display on the graphic screen 14, and they thus implicitly include the meaning that the previously transmitted instructions form a consistent whole, since they should be displayed on the graphic screen 14 without waiting for graphic instructions.

Consequently, in the embodiments of the invention, these instructions are used to determine that the graphic instructions previously received form a consistent whole and to then cause their exportation to the storage unit 18.

Therefore, when in step 39, the response to the test is positive, meaning, when a "wglSwapBuffers" or "glFlush" instruction was received, the instructions previously received by the DLL 15 form a consistent whole, and the DLL 15 implementing the process of the invention then moves to step 40 where a module 17, named Raider 3D, does the exporting, to the storage unit 18, of the Points and Triangles tables stored in the memory 16.

In the process of the invention, the memory 16 in which the Points and Triangles tables are stored is a shared memory in the computer implementing the process of the invention, which means that it can be written by DLL 15, and reread simultaneously by the Raider 3D module 17.

In a first embodiment of the invention, the Points and Triangles tables are exported to the storage unit 18 in the form of simple text files in which the points and the triangles are recorded in files of the same name in the storage unit 18.

Figure 4:
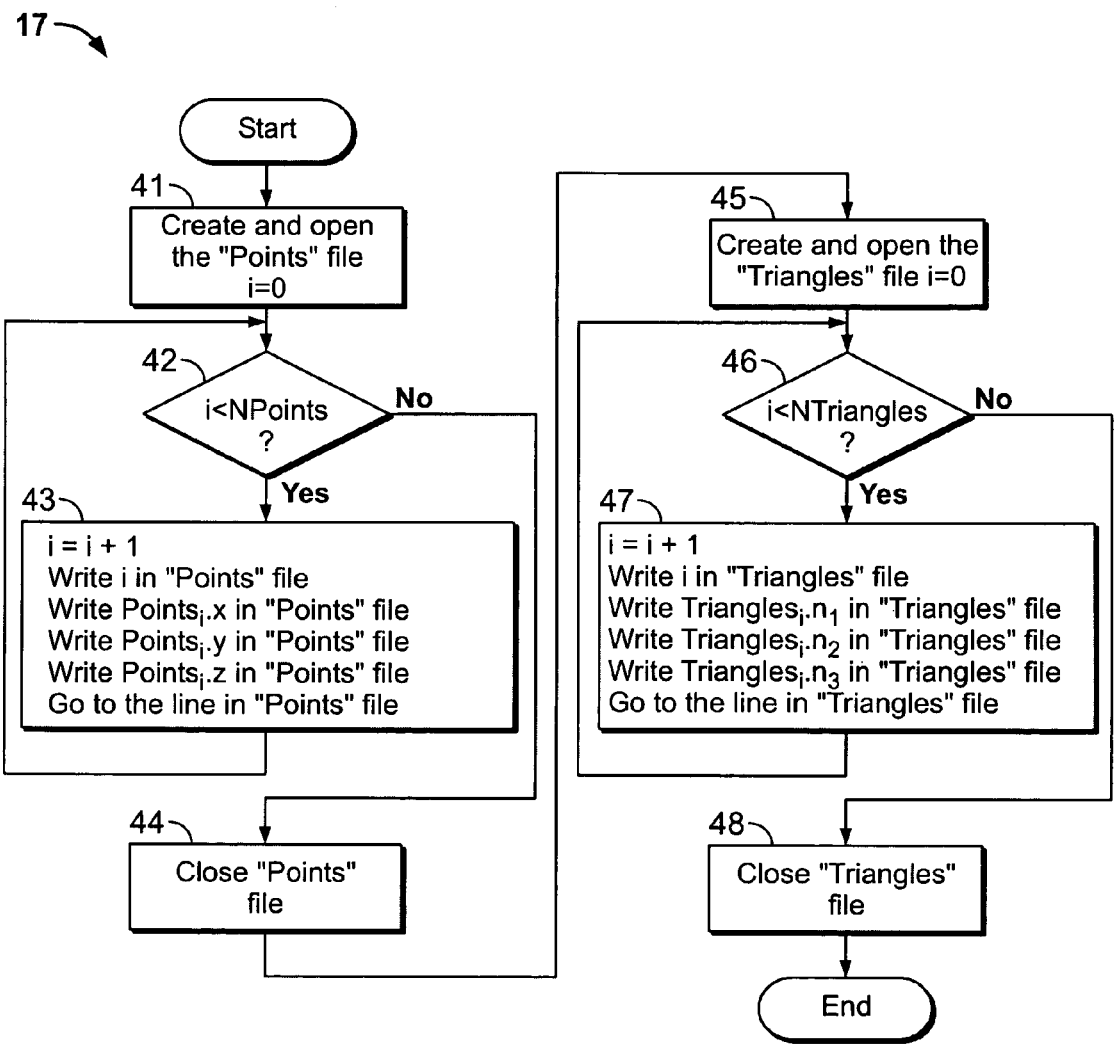
FIG. 4 is the detailed flowchart of box 40 in FIG. 3 in a first embodiment of the invention.

Referring further to FIG. 4, we will now describe the operation of the Raider 3D module 17 according to a first embodiment of the process of this invention.

In this first embodiment, at step 41, the Raider 3D module 17 creates and opens a point exportation file, named "Points" in the example described, in the storage unit 18, it initializes the number i of points recorded in the file "Points" at value 0, then it moves to step 42.

In step 42, the Raider 3D module 17 tests whether the number i of points recorded in the "Points" file is lower than the number of NPoints points present in the shared memory. If the response to step 42 is positive, the Raider 3D module 17 moves to step 43. In step 43, the Raider 3D module 17 increases by one unit the value of number i, then it writes in the "Points" file the new value of the number i, followed, on the same line, by the three x, y and z coordinates of the corresponding number i point, copied from input i of the "Points" file stored in the shared memory 16. The Raider 3D module 17 then moves to the line in the "Points" file, then it returns to step 42.

If the response to step 42 is negative, the Raider 3D module 17 moves to step 44. In step 44, the Raider 3D module 17 closes the "Points" file, then moves to step 45. In step 45, the Raider 3D module 17 creates and opens in the storage unit a triangle exportation file, called "Triangles" in the example described, then it initializes at zero the value of the number i of triangles written in the "Triangles" file. It then moves to step 46.

In step 46, the Raider 3D module 17 tests whether the number i of triangles recorded in the "Triangles" file is lower than the number of NTriangles triangles present in the shared memory. If the response to step 46 is positive, the Raider 3D module 17 moves to step 47. In step 47, the Raider 3D module 17 increases the number i of a unit, then it writes in the "Triangle" files the number i of the current triangle and, on the same line of the "Triangle" file, it copies the numbers $n_1$, $n_2$ and $n_3$ of the three points forming the triangle of number i, from the input i of the "Triangle" tables stored in the shared memory. The module 17 then returns to step 46.

If, in step 46, the response is negative, the Raider 3D module 17 then moves to step 48 where it closes the "Triangles" exportation file.

The "Points" and "Triangles" text files obtained in the previous example will then have the form presented in tables 1 and 2 below respectively.

TABLE 1

| | |
|---|---|
| 1 | 0.000, 10.000, 0.000 |
| 2 | 0.000, 10.000, −10.000 |
| 3 | 0.000, 0.000, 0.000 |
| 4 | 0.000, 0.000, −10.000 |

TABLE 2

| | |
|---|---|
| 1 | 1, 2, 3 |
| 2 | 2, 3, 4 |

The process of exporting data linked to geometric entities according to the first embodiment of the invention is then terminated, and as we have just seen, it would have made it possible to export the geometric model 10 created and/or manipulated by the graphic application 11 with no knowledge of the format of the data of this graphic application 11 and with no development of the program specific to this graphic application 11.

In a second embodiment of the invention, the exportation format used is the DXF (Drawing eXchange Format) of the AutoDesk company, which is the reference format for the market of exportation materials of data associated with geometric entities.

The DXF format is a text format at the rate of one piece of information per line. The lines are grouped in pairs, with the first line of the pair containing a whole number datum indicating the type of data appearing in the following line. Thus, when the numerical type data is a whole number between 0 and 9, the data appearing in the following line will be a chain of characters, and when the numerical type data is a whole number between 10 and 59, the data appearing on the following line will be a tridimensional double-precision floating points coordinate.

Additionally, a DXF file is organized in sections. A section is introduced [by] a pair of lines, one line formed of the figure 0 introducing a chain of characters, and one line formed of the keyword SECTION, and it is terminated by a pair of lines, the first of which is formed of the figure 0 and the second of the keyword ENDSEC.

A DXF file includes a certain number [of] different section types, in particular, the section ENTITIES describing the geometric entities, as well as a certain number of other sections, such as the sections defining parameters or classes, which are not in this description.

The ENTITIES section is formed of the various geometric entities of the geometric model, with each entity being introduced by a chain of characters indicating the type of entity, followed by the parameters needed to define the entity in question.

For example, the definition of a facet in the space is introduced by a pair of lines, the first of which is formed of the figure 0 introducing a chain of characters, followed by a line formed of the keyword 3DFACE.

A facet in the space is formed of three or four points respectively forming a triangle or a quadrangle, with the fourth point being specified as identical to the third to indicate, by convention, a triangle rather than a quadrangle. Each of the four points of a facet is defined by its three x, y and z coordinates, and each of the coordinates is defined, as previously indicated, by a pair of lines, the first of which is a whole number indicator between 10 and 59, and the second of which is the coordinate.

In the DXF format specification, the indicators for the $x_1$, $y_1$ and $z_1$ coordinates of the first point of the facet are 10, 20 and 30, respectively, the indicators for the $x_2$, $y_2$ and $Z_2$ coordinates of the second point of the facet are 11, 21 and 31, respectively indicators for the $x_3$, $y_3$ and $z_3$ coordinates of the third point of the facet are 12, 22 and 32, respectively, and the indicators for the $x_4$, $y_4$ and $z_4$ coordinates of the first point of the facet are 13, 23 and 33, respectively.

In other words, for the point of number j, with j varying from 1 to 4 on a facet, the numerical indicator of the x coordinate of point j is 9+j, the numerical indicator of the y coordinate of point j is 19+j and the numerical indicator of the z coordinate of point j is 29+j.

Figure 5:
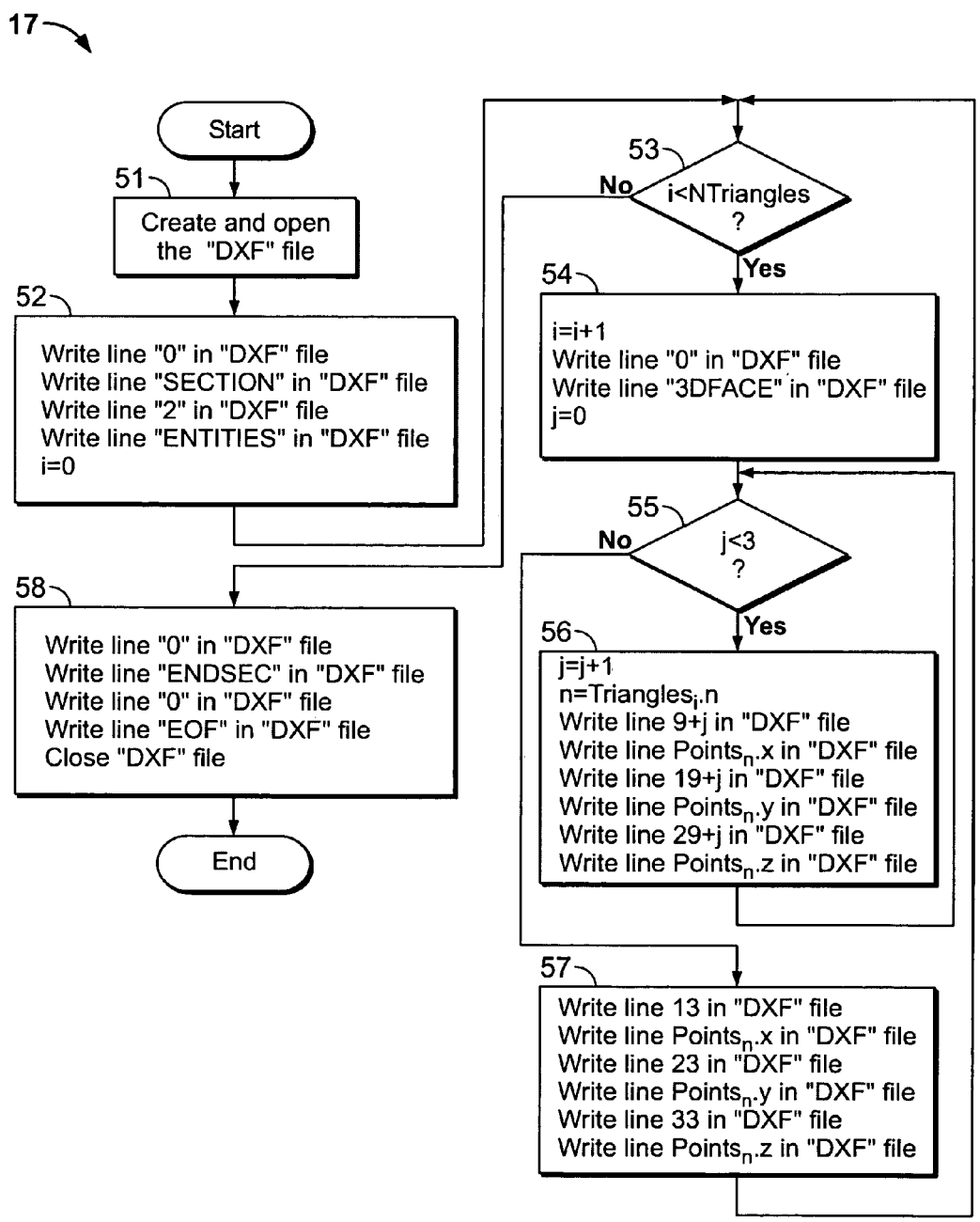
FIG. 5 is the detailed flowchart of box 40 in FIG. 3 in a second embodiment of the invention.

More specifically, referring now to FIG. 5, the Raider 3D module 17 according to the second embodiment of this invention creates and opens in step 51 an exportation file named, in the example given, "DXF," then it moves to step 52. In step 52, the Raider 3D module 17 writes the header lines of the file in the DXF format, meaning the following four lines:

0
SECTION
2
ENTITIES

Then it initializes at 0 the number i of facets described in the "DXF" file. The Raider 3D module 17 then moves to step 53. In step 53, the Raider 3D module 17 tests whether the number i of facets written is lower than the number of triangles stored in the shared memory.

If the response to step 53 is positive, meaning if the number i of triangles previously written in the DXF file is lower than the number NTriangles of triangles stored in the shared memory 16, the Raider 3D module 17 moves to step 54. In step 54, the Raider 3D module 17 increases by one unit the number i of triangles previously written in the file, then it writes the header lines in DXF format for a facet, meaning the following two lines:

0
3DFACE

In addition, still in step 54, the Raider 3D module 17 initializes at 0 the number j of points of the triangle i described in the "DXF" file, then it moves to step 55. In step 55, the Raider 3D module 17 tests whether the number j of points of the triangle i written in the "DXF" file is lower than 3. If the response is positive, the Raider 3D module 17 moves to step 56.

In step 56, the Raider 3D module increases by one unit the number j of points of the triangle i written in the "DXF" file and calculates a number n as being equal to Triangles.$n_j$, meaning n becomes equal to the number $n_j$ of point j of triangle i. It then successively writes the indicator of the x coordinate for point j of the facet in the DXF format, meaning value 9+j, on a first line, then the x coordinate itself on a second line, for the point whose number n was previously calculated.

Likewise, still in step 56 and still for the point of number n, the Raider 3D module 17 respectively writes the indicator 19+j on a third line and the y coordinate on a fourth line, then the indicator 29+j on a fifth line and the z coordinate on a sixth line. The Raider 3D module then returns to step 55.

The process of steps 55 and 56 is repeated until in step 55 the response becomes negative, meaning the number j of points of the triangle written in the "DXF" file is equal to 3. At this point in the operations, the Raider 3D module 17 will then have written the three points of the triangle i.

When i equals 1, meaning for the first triangle, the Raider 3D module 17 will then have written successively the following lines in the "DXF" file:

10
0.0
20
10.0
30
0.0 for point $n_1$=1 of the triangle 1, then these lines:

11
0.0
21
10.0
31
−10.0 for point $n_2$=2 of the triangle 1, then these lines:

12
0.0
22
0.0
32
0.0 for point $n_3$=3 of the triangle 1.

When in step 55 the number j of points written in the "DXF" file is equal to 3, the Raider 3D module moves to step 57. At the beginning of step 57, the Raider 3D module will then have written in the "DXF" file the three points of the triangle i in the form indicated above. However, as the DXF specification requires four points for a facet, as previously mentioned, the third point of number $n_3$ is repeated, which means, per DXF convention, that the facet described is a triangle.

To that end, in step 57, the Raider 3D module writes in the file the x coordinate indicator for the fourth point of the facet, or 13, on a first line, then the x coordinate on a second line. Likewise, it successively writes the y coordinate indicator, or 23, on a third line and the y coordinate on a fourth line, and the z coordinate indicator, or 33, on a fifth line and the z coordinate on a sixth line.

When i equals 1, meaning for the first triangle, this is reflected in the fact that in step 57, the Raider 3D module 17 writes the following lines in the "DXF" file:

13
0.0
23
0.0
33
0.0 which repeat the coordinates of the previous point of the current facet, meaning the third point of the first triangle.

At the end of step 57, the Raider 3D module 17 then returns to step 54 to export the following triangle, using the same process as that described above for the first triangle, until, in step 54, the response is positive.

When the response is positive in step 54, meaning that all of the triangles previously stored in the shared memory 16 were written in the "DXF" file, then the Raider 3D module 17 moves to step 58. In step 58, the Raider 3D module 17 writes the end of section lines, meaning the following two lines:

0
ENDSEC

Then the two lines indicating the end of the DXF exportation file, meaning:

0
EOF

Then, still in step 58, the Raider 3D module 17 closes the "DXF" file, which will then have the form presented in Table 3 below:

TABLE 3

```
0
SECTION
2
ENTITIES
0
3DFACE
10
0.0
20
10.0
30
0.0
11
0.0
21
10.0
31
−10.0
12
0.0
22
0.0
32
0.0
13
0.0
23
0.0
33
0.0
0
3DFACE
10
0.0
20
10.0
30
−10.0
11
0.0
21
0.0
31
0.0
12
0.0
22
0.0
32
−10.0
13
0.0
23
0.0
33
−10.0
0
ENDSEC
0
EOF
```

The process of exporting data linked to geometric entities according to the second embodiment of this invention is then terminated, and as we have just seen, it will have made it possible to export the geometric model 10 created and/or manipulated by the graphic application 11 with no knowledge of the data format of this application, with no modification of this graphic application 11 and with no development of the program specific to this graphic application 11.

Obviously, the process of the invention is not limited to the interception and exportation of the graphic functions of points and triangles described above. In particular, in the example described previously, the function used for generating points was the glVertex3fv function, but it will be clear to anyone competent in the technology that the preceding description applies with basic adaptations to any instruction from the glVertex group.

In addition, it should be perfectly clear from the preceding description that the process of the invention allows exportation of any desired OpenGL function, including, but not limited to, the functions defining quadrangular components, those defining surface orientation information such as the normal of a point, those defining color information, surface texture, transparency, etc.

Also, the process is not limited to the exportation of geometric structures as simple as those in the example described, but it will be obvious to experts that the process of the invention makes it possible to export any geometric model, due to the fact that any modeled structure, as complex as it may be, will be displayed with the help of point primitives, triangles, quadrangles, etc., and may thus be exported using the process described above.

Likewise, for obvious reasons of simplicity in the description, it was assumed that all of the geometric structures used, the points in particular, were distinct, and that consequently there was no need to seek to eliminate duplications or to optimize the tables used in any manner. In practice, the duplicated components would clearly be deleted by an appropriate process, either during their recording in the Points and Triangles tables by the DLL 15 program or during their exportation to the storage unit 18 by the Raider 3D module 17.

Also, the process is not limited to the described embodiments using the OpenGL graphic library, and it will be obvious to anyone competent in the technology that the process described above also applies to any other library of display functions likely to be used by the modeling or geometric modeling application, such as, including but not limited to, the Microsoft DirectX display library.

Additionally, the process of the invention can be implemented only for a desired specific application, rather than for all of the graphic applications present in the modeling and/or manipulation system, installing the DLL implementing the process of the invention only in the directory of the desired application, rather than in the Windows operating system directory.

According to the foregoing, it is clear that the process of the invention made it possible to export the geometry information from the example modeled by the application, with no modification of this application, with no program development specific to this application and with no knowledge of the data format used by the latter, only by intercepting the graphic primitives and functions that this application uses to display its geometric models.

Considering that the data format used to store the data associated with the geometric entities exported into the storage unit will be either a known, open format such as that presented in the first embodiment, or a standard market format such as the DXF format, or any other format needed for a specific application, it will be very easy to import these data into any other desired geometric modeling and/or manipulation system.

The process of the invention is thus likely to be applied in a very wide variety of fields, in particular, in all of the fields in which data associated with geometric entities need to be exchanged among different systems, as occurs in all of the industries and services using data associated with geometric entities, such as the automobile construction or aeronautic, industrial design, building and/or architecture, videogame, etc. services or industries.

The invention claimed is:

1. A computer-implemented method comprising:
in a running graphics application program, receiving a sequence of function calls from a computer-assisted design (CAD) program to one or more drawing functions, the drawing functions implementing an application program interface (API) for generating graphical output on a two-dimensional medium, wherein the drawing functions are implemented in a library substitute for an original library implementing the API;
in response to each function call, determining in an automatic manner without human intervention if the function call is one of one or more predetermined kinds of function calls, and if it is then:
if the function call is of a kind that passes point data, adding the point data to a data structure,
if the function call is of a kind that passes entity data, adding the entity data to the data structure, and
if the function call is of a kind that indicates an end condition, exporting the data in the data structure to one or more text export files and clearing the data structure of the data so that the data is not exported a second time;
after receiving the last of the sequence of function calls, closing the one or more export files;
wherein the sequence of function calls comprises two or more end condition function calls, so that exporting occurs two or more times in response to the two or more end condition function calls;
wherein the point data represents one or more vertices and the entity data represents one or more geometric entities; and
wherein the text export file is in a second format, the second format being different from a first format used by the CAD program, wherein the data structure comprises a plurality of tables, and the wherein the point data is added to a first table and the entity data is added to a second table.

2. The computer-implemented method of claim 1, wherein the one or more text export files are drawing exchange format (DXF) files.

3. The computer-implemented method of claim 1, wherein the entity data include data identifying a triangle.

4. The computer-implemented method of claim 1, wherein the entity data include data identifying a quadrilateral.

5. The computer-implemented method of claim 1, wherein the entity data include data identifying a normal vector to a surface.

6. The computer-implemented method of claim 1, wherein the entity data includes color information.

7. The computer-implemented method of claim 1, wherein the entity data includes surface texture information.

8. The computer-implemented method of claim 1, wherein the entity data includes transparency information.

9. The computer-implemented method of claim 1, wherein exporting the data includes recording the data in an external storage unit.

10. A computer program product, tangibly embodied on a computer-readable medium, comprising instructions operable to cause a computer to:
in a running graphics application program, receive a sequence of function calls from a computer-assisted design (CAD) program to one or more drawing functions, the drawing functions implementing a first application program interface (API) for generating graphical output on a two-dimensional medium, wherein the drawing functions comply with a second API and are implemented in a library substitute for a library implementing the second API;
in response to each function call, determine in an automatic manner without human intervention if the function call is one of one or more predetermined kinds of function calls, and if it is then:
if the function call is of a kind that passes point data, add the point data to a data structure,
if the function call is of a kind that passes entity data, add the entity data to the data structure, and
if the function call is of a kind that indicates an end condition, export the data in the data structure to one or more text export files and clearing the data structure so that the data is not exported a second time;
after receiving the last of the sequence of function calls, close the one or more export files;
wherein the sequence of function calls comprises two or more end condition function calls, so that exporting occurs two or more times in response to the two or more end condition function calls;
wherein the point data represents one or more vertices and the entity data represents one or more geometric entities; and
wherein the text export file is in a second format, the second format being different from a first format used by the CAD program, wherein the data structure comprises a plurality of tables, and the wherein the point data is added to a first table and the entity data is added to a second table.

11. The computer program product of claim 10, wherein the one or more text export files are drawing exchange format (DXF) files.

12. The computer program product of claim 10, wherein the entity data include data identifying a triangle.

13. The computer program product of claim 10, wherein the entity data include data identifying a quadrilateral.

14. The computer program product of claim 10, wherein the entity data include data identifying a normal vector to a surface.

15. The computer program product of claim 10, wherein the entity data includes color information.

16. The computer program product of claim 10, wherein the entity data includes surface texture information.

17. The computer program product of claim 10, wherein the entity data includes transparency information.

18. The computer program product of claim 10, wherein exporting the data includes recording the data in an external storage unit.

* * * * *

UNITED STATES PATENT AND TRADEMARK OFFICE
CERTIFICATE OF CORRECTION

PATENT NO. : 7,150,026 B2  Page 1 of 1
APPLICATION NO. : 10/482742
DATED : December 12, 2006
INVENTOR(S) : Francois le Masne de Chermont It is certified that error appears in the above-identified patent and that said Letters Patent is hereby corrected as shown below:

Title Page;

Page 1, Section 12:
 delete "le Masno do Chormont" and replace with -- le Masne de Chermont --

Page 1, Section 75:
 delete "Francois le Masno do Chormont",
 and replace with -- Francois le Masne de Chermont --

Claim 1:
 Column 15, line 47:
 delete "and the wherein", and replace with -- and wherein --

Claim 10
 Column 16, line 41:
 delete "and the wherein", and replace with -- and wherein --

Signed and Sealed this

Seventeenth Day of March, 2009

JOHN DOLL
*Acting Director of the United States Patent and Trademark Office*